United States Patent [19]

Alexander

[11] 4,374,563
[45] Feb. 22, 1983

[54] NOVEL PACKAGE FOR WATER SANITIZING CHEMICAL AND METHOD FOR PREPARING IT

[75] Inventor: Roy P. Alexander, Killingworth, Conn.

[73] Assignee: Olin Corporation, New Haven, Conn.

[21] Appl. No.: 200,801

[22] Filed: Oct. 27, 1980

[51] Int. Cl.³ .................... B65D 85/62; B65D 65/00
[52] U.S. Cl. .................................. 206/499; 206/0.5; 206/497; 53/442; 53/447
[58] Field of Search ............... 206/0.5, 445, 499, 497; 53/442, 447

[56] References Cited

U.S. PATENT DOCUMENTS

| | | |
|---|---|---|
| 2,711,346 | 6/1955 | Irwin et al. .................... 206/499 |
| 3,147,857 | 9/1964 | Eckles ............................ 206/445 |
| 3,342,674 | 9/1967 | Kowalski . |
| 3,483,989 | 12/1969 | Gopstein ........................ 206/0.5 |
| 3,754,871 | 8/1973 | Hessel et al. . |
| 3,856,932 | 12/1974 | May . |

Primary Examiner—William T. Dixson, Jr.
Attorney, Agent, or Firm—Arthur E. Oaks; Donald F. Clements

[57] ABSTRACT

A novel package of available chlorine compound comprised of a stack of a plurality of tablets enclosed in a liquid impervious synthetic material. The package is prepared by placing the stack of tablets in a tube of heat shrinkable synthetic material and then heating to effect shrinkage and to form a tightly adhering tube of synthetic material around the cylindrical exterior of the tablets. The resulting package can be adjusted to size by cutting where desired between tablets. The packages are useful in sanitizing water, particularly swimming pool water by placing them in a strainer basket of a skimmer unit.

16 Claims, 4 Drawing Figures

NOVEL PACKAGE FOR WATER SANITIZING CHEMICAL AND METHOD FOR PREPARING IT

This invention relates to a novel package for water sanitizing chemical and a process for preparing it.

Numerous efforts have been made to prepare water sanitizing chemicals containing available chlorine in dosage units that provide uniform distribution of available chlorine in the water being treated over a predetermined fixed period of time.

In U.S. Pat. No. 3,342,674 which issued Sept. 19, 1967, to Kowalski, the difficulty of compressing available chlorine compounds such as trichloroisocyanuric acid and alkaline earth metal hypochlorites into stick and tablet form was recognized. The Kowalski patent disclosed the concept of adding an alkali metal stearate to the available chlorine compound to produce sticks and tablets which resisted degradation after compression. This technique, however, did not improve or affect the rate of dissolution of available chlorine or enhance the length of the time period over which a specific dosage unit was effective.

U.S. Pat. No. 3,754,871 issued Aug. 28, 1973, to Hessel et al discloses a package of tablets useful for sanitizing water in which tablets of the available chlorine compound are secured to the surface of a porous matrix and enclosed with a water impermeable synthetic material on the top and sides. When the package is placed in water, water by osmosis penetrates the porous underside of the matrix, gradually dissolves the available chlorine compound and the resulting solution, by osmosis, returns through the porous matrix to the water being treated for sanitizing thereof. This package provides little or no control of the rate of dissolving the tablets. In addition, FIG. 4 shows that a variety of sizes of tablets are required to vary the rate of solubility of the chemical compounds and tablets. Further, once the package is formed with a specific number of tablets contained therein, it is not possible to adjust the effective dosage units of the available chlorine compound in the package.

U.S. Pat. No. 3,856,932 issued Dec. 24, 1974, to May discloses a tablet of available chlorine compound comprised of two substantially parallel planes secured to a perpendicular cylindrical exterior surface. The exterior surface and preferably one of the planes is covered with an impervious film which is secured to the tablet by means of a suitable adhesive. As a result, one or two of the parallel faces, when the tablet is placed in the water to be treated, is dissolved at a relatively uniform rate. However, the use of a separate adhesive to apply the film to exterior surfaces adds significantly to the cost of the tablet and also may add an additional impurity to the water being sanitized.

There is a need at the present time for an improved package of water treating chemical which releases available chlorine at a relatively uniform rate over a fixed predetermined period of time.

It is a primary object of this invention to provide a novel package for available chlorine compounds which release available chlorine to water to be sanitized at a relatively uniform rate.

A further object of this invention is to provide an improved package for available chlorine compound which releases available chlorine to the water being treated over a fixed predetermined period.

Still another object of the invention is to provide a method for preparing an improved package of available chlorine-containing compounds useful for sanitizing water.

It is a further object of the invention to provide an improved method of sanitizing water utilizing an improved package of available chlorine containing compounds.

These and other objects of the invention will be apparent from the following detailed description thereof.

It has now been discovered that the following objects are accomplished in a novel package of available chlorine compounds comprised of:

a. a plurality of tablets of said available chlorine compound:
 1. each of said tablets having two substantially parallel plane faces joined to a cylindrical exterior, and
 2. each of said tablets being stacked together with one said plane of one said tablet next to one said plane of another said tablet, to form a stick of desired length having a longitudinal axis perpendicular to said planes, b. said stick being covered with a sheet of liquid impervious synthetic material secured at opposite ends around said cylindrical exterior, leaving at least one plane of each tablet at each end of said stick uncovered.

The foregoing objects of this invention are further accomplished in a method for preparing a novel package of available chlorine compound for sanitizing water which comprises:

a. placing a plurality of tablets of said compound in a stack:
 1. each of said tablets having two substantially parallel plane faces joined to a cylindrical exterior,
 2. each of said tablets being stacked together with one said plane of one said tablet next to one said plane of another said tablet, to form a stick of desired length having a longitudinal axis perpendicular to said planes, b. placing said stick on a sheet of heat shrinkable, liquid impervious synthetic material:
 1. said sheet having at least one heat shrinkable axis perpendicular to two opposite edges of said sheet,
 2. said longitudinal axis of said stick being positioned perpendicular to said heat shrinkable axis, c. heat sealing one said edge to said opposite edge to form a cover for said stick around said cylindrical exterior of each of said tablets, d. heating the resulting covered stick to shrink said synthetic material around the exterior surface of said synthetic material and to form a tight, water impervious cover on said cylindrical exteriors.

The objects of this invention are further accomplished in a method for sanitizing water wherein a predetermined number of novel packages of this invention containing a predetermined number of tablets are placed in a strainer basket of a swimming pool skimmer unit and water to be sanitized, such as water from a swimming pool, is circulated through the skimmer to remove undesirable solid foreign objects and to dissolve the available chlorine compound from the packages contained in the strainer basket, thereby sanitizing water containing the dissolved available chlorine compound.

Figure 1:
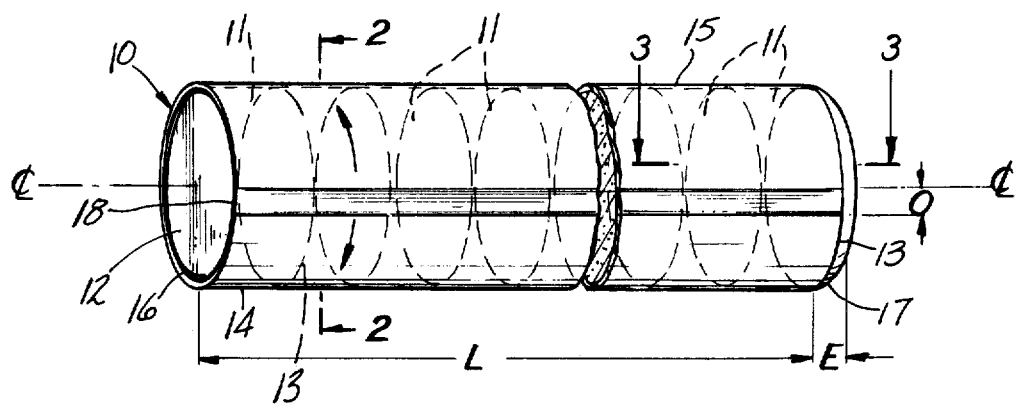
FIG. 1 shows an isometric view of the novel package of this invention containing tablets of available chlorine compound which are contained in a tube of impervious synthetic material.

More in detail, FIG. 1 shows the novel package 10 of this invention which is comprised of a plurality of tablets 11 of available chlorine compound. Each tablet 11 has one plane face 12 opposite a substantially parallel plane face 13 which are joined to a cylindrical exterior 14. Each tablet has a radius R and the tablets are stacked together along a center line CL to form a stick 15 having a length L.

Stick 15 is enclosed in a sheet 16 of liquid impervious synthetic material which has a length corresponding to at least length L, but may extend, as shown in the figure, beyond at least one opposite plane 13 for distance E. The extended portion 17 may be heat sealed or otherwise sealed to cover opposite plane 13, if desired. Sheet 16 corresponds to the circumference of the stick plus an overlapping portion 18 which overlaps the opposite side of the sheet 16 for overlapping distance O.

Sheet 16 is comprised of a liquid impervious synthetic material which is heat shrinkable in at least one direction. The arrows on FIG. 1 show the direction of the axis of heat shrinking of sheet 16 when applied to stick 15. The heat shrinking axis, as shown by the arrows in FIG. 1 is in a plane perpendicular to center lines CL.

Figure 2:
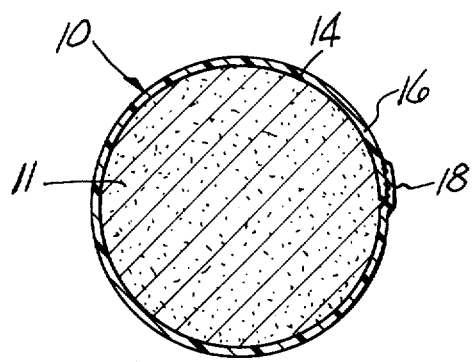
FIG. 2 shows a cross sectional view of the novel package of available chlorine compound of FIG. 1 through lines 2—2 thereof.

FIG. 2 is a cross sectional view of package 10 through lines 2—2 of FIG. 1 and shows tablet 11 having cylindrical exterior 14 covered with sheet 16 which is sealed at overlapping portion 18.

More in detail, any available chlorine compound in tablet form useful for the sanitization of water can be employed in preparing the novel package of this invention. Although trichloroisocyanuric acid and alkali metal hypochlorites such as calcium hypochlorite are the preferred available chlorine compounds, one skilled in the art will recognize that a wide variety of available chlorine compounds are suitable for use in tablet form as a starting material. For example, typical available chlorine compounds are disclosed in U.S. Pat. No. 3,342,674 which issued to Kowalski on Sept. 19, 1967. The tablets preferred in the preparation of the novel packaging of this invention have a diameter in the range of from about 0.25 to about 2.0 inches and a height from about 0.25 to about 1.0 inch. However, larger of smaller tablets may be employed, if desired.

The length of the stick used to prepare each package may be fixed, but then adjusted by the user according to the size of the strainer screen used in the skimmer apparatus for the pool water treatment system and the length of effectiveness time required by pool conditions. A typical design of a strainer basket for a skimmer apparatus is shown in U.S. Pat. No. 4,154,679 which issued May 15, 1979, to Fred Farage. Generally the strainer basket has a diameter of about 6 inches and a height of about 6 inches, but these dimensions will vary considerably depending upon the brand and type of skimmer apparatus employed. Therefore the length and number of sticks used by the pool owner will be determined by the size of the strainer basket, size of pool, water flow rate through skimmer, skimmer cycle time, and desired length of time for chlorinating and sanitizing the water.

One of the advantages of the package of this invention is that uniform packages having a length L, preferably equivalent to a stack of from about 40 to about 50 tablets 11 are made and sold uniformly to all pool owners. Generally the stack may range from about 8 to about 60 tablets. The pool owner simply cuts the stick to the length that fits most conveniently into the strainer basket of the skimmer apparatus of the pool being treated. For example, if the strainer basket has a height corresponding to stick length of 1/10L, the pool owner simply cuts each stick in ten parts and adds the resulting cut sticks to the strainer as desired. For example, if each stick contains about 50 tablets, the sticks can be cut into a plurality of shorter sticks which contain from about 2 to about 10 and preferably from about 4 to 9 tablets per shorter stick. Only the exposed planes 12 and 13 of exterior tablets are contacted by the water passing through the strainer during the entire time that the package is in the strainer since sheet 16 prevents water from dissolving the cylindrical exteriors. Since sheet 16 is transparent or translucent, the pool operator can easily determine by inspection which packages should be removed from the strainer and replaced in order to maintain a relatively uniform rate of chlorination of the water being treated.

Sheet 16 is any liquid impervious synthetic material capable of heat shrinking after being secured to cylindrical exterior 14 of tablets 11. It is preferred to utilize a transparent material such as heat shrinkable polyethylene, but other suitable materials include polypropylene, polyvinylchloride, polyvinylidene chloride, and the like.

In the method of preparing a novel package of this invention, the appropriate number of tablets are stacked along center line CL and then wrapped in sheet 16. The overlapping portion 18 of sheet 16 is then heat sealed to the opposite edge of sheet 16 to form the tightest fit possible while still obtaining a continuous seal. As indicated above, the direction of the shrinking axis is in a plane perpendicular to the center line CL of stick 15. After the tablets 11 have been enclosed in sheet 16, the entire package is heated by a convenient technique, such as the use of a heat gun to effect shrinkage of the sheet 16 and to produce a water impervious cover for cylindrical exterior 14. If desired, extended portion 17, if present, can be heat sealed to form a water-tight enclosure thereby permitting dissolution of the tablets through the only open end of the package at plane 12.

Figure 3:
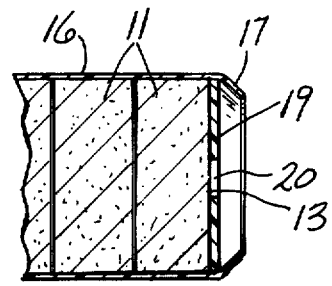
FIG. 3 is a cross sectional view through lines 3—3 of FIG. 1, showing a package end containing a partial closure of the end.

FIG. 3 is a cross sectional view through lines 3—3 of FIG. 1, showing an embodiment of the invention encompassing a package end containing a partial closure of the end. As shown in FIG. 3, a partial closure or cap plug 19 is placed against opposite plane 13 of end tablet 11 prior to shrinking sheet 16. When shrinking of sheet 16 is effected, extended portion 17 reduces in dimensions and holds cap plug 19 against tablets 11. Opening 20 in cap plug 19 may be of any convenient size, generally equivalent to about one half or more of the diameter of cap plug 19. If desired, cap plugs 19 may be placed in each end of package 10 to reduce the rate of dissolving tablets 11.

Figure 4:
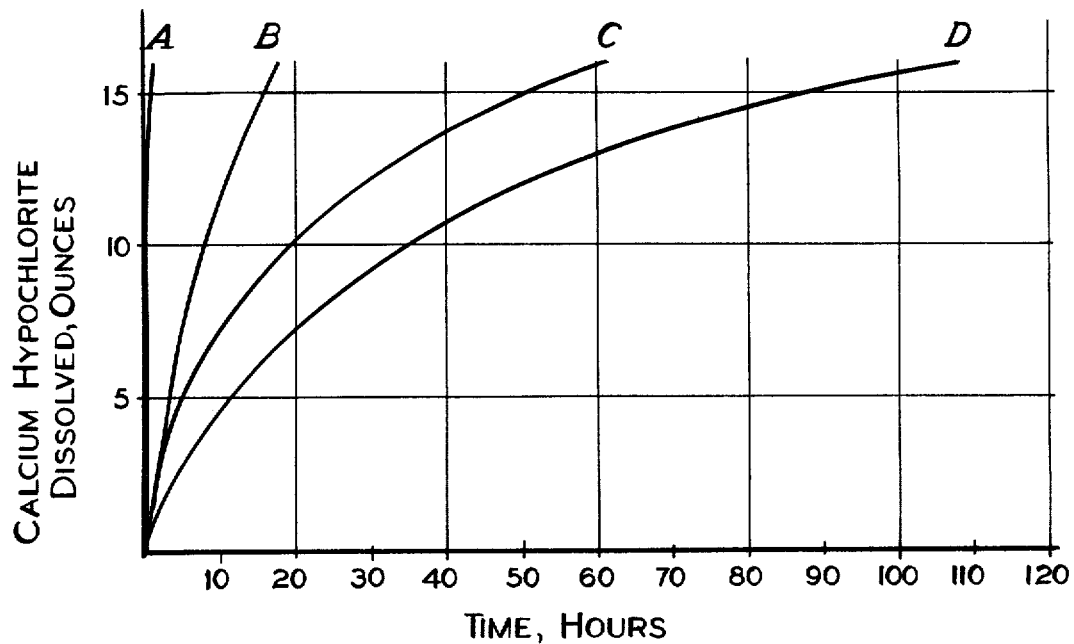
FIG. 4 shows the variation of weight of tablet dissolved with time for various forms of calcium hypochlorite tablets in a pool skimmer.

FIG. 4 shows the variation with time of the weight dissolved of an available chlorine compound, such as calcium hypochlorite for various forms of tablets in a pool skimmer. In Tests A, B, and C, 16 ounces of calcium hypochlorite tablets, each tablet having a thickness of about ¼ inch, a diameter of about ¾ inch and weighing about 7 grams were used. In Test D, two tablets, 3 inches in diameter by 1 inch thick were employed. In each test, the skimmer was fed pool water at the rate of about 20 gallons per minute.

In Test A, 16 ounces of tablets were randomly distributed in the skimmer basket and about 45 minutes were required to dissolve the tablets.

In Test B, sixteen packages containing five tablets each enclosed in a sheet of polyethylene in accordance with this invention, each package having each end exposed were placed in the skimmer basket. About 18 hours were required to dissolve about 16 ounces of these tablets.

In Test C, nine packages containing nine tablets each enclosed in a sheet of polyethylene in accordance with this invention, each package having each end exposed, were placed in the skimmer basket. About 61 hours were required to dissolve about 16 ounces of these tablets.

In Test D, the two tablets were enclosed in a sheet of polyethylene in accordance with this invention with a cap plug at each end, the hole in the center of each cap plug having a diameter of about 1¼ inches. The tablets in this test required about 109 hours to dissolve. Thus, it can be seen that the packages of this invention as shown in Tests B, C, and D permit a wide variety of dissolving rates for each pound of calcium hypochlorite employed.

The following examples are presented to define the invention more fully without any intention of being limited thereby.

EXAMPLES 1-3

A novel package of this invention was prepared by stacking 16 tablets of calcium hypochlorite, each of which weighed about 7 grams and had a diameter of about 0.75 inches and a height of about 0.5 inches. The stack was wrapped in a sheet of shrinkable polyethylene which was two mils thick oriented so that subsequent heat shrinkage reduced the diameter of the polyethylene tube. The polyethylene sheet was heat sealed over its entire length to form a polyethylene sleeve on the stack of calcium hypochlorite tablets. A heat gun was used to shrink the polyethylene sleeve and form a tight sleeve around the tablets without the need for any adhesive to keep water out of contact with the cylindrical exterior of the tablets. No extended portion of the polyethylene sleeve was present. The resulting package was identified as EXAMPLE 1. Two similar packages were prepared in an identical way except that the thickness of the shrinkable polyethylene was 4 mils and 6 mils, respectively. The resulting packages were identified as EXAMPLES 2 and 3, respectively.

Each package was cut into lengths of 5 tablets, 9 tablets and 2 tablets.

Each of the three 5 tablet chlorinating sticks of EXAMPLES 1-3 were placed in the strainer basket of a swimming pool skimmer with a water flow of about 20 gallons per minute. Each stick was dissolved after about 17 hours and each stick released approximately 0.06 ounces per hour of calcium hypochlorite. There was no residue of available chlorine compound remaining in the polyethylene tubes and none of them collapsed to stop the dissolving action. The dissolving of the available chlorine compound could easily be followed because the size of the remaining tablets could be determined visibly by inspection of the strainer screen contents. Each of the sticks gradually erroded from the ends and there was no wetting of the interior tablets until the adjacent tablet was completely dissolved. The empty sleeves were easily removed from the strainer basket at the end of the period, along with accumulated debris collected from the pool water.

The three sticks of EXAMPLES 1-3 containing 9 tablets each were placed in the pool skimmer with a water flow rate of 20 gallons per minute. Each stick required more than 46 hours of contact to completely dissolve all of the available chlorine compound in the stick. Each stick released calcium hypochlorite at an average rate of about 0.04 ounces per hour. None of the tubes collapsed during the run and none contained any residue after the tablets dissolved.

These tests show that extended periods of operation (i.e., 17 hours and 46 hours) of sanitization protection can be obtained with the novel package of this invention.

For comparison, when conventional tablets of the same size used to prepare the novel package of this invention were placed at random in the same strainer basket under the same conditions, all of the tablets dissolved in about 45 minutes, thus resulting in a relatively high concentration of available chlorine compound in the pool water over a short period of time, without obtaining a uniform distribution of the available chlorine over an extended period.

What is claimed is:

1. A novel package of available chlorine compound for placing in the strainer basket of a swimming pool skimmer unit comprised of:
   a. a plurality of tablets of said available chlorine compound:
      1. each of said tablets having two substantially parallel planes joined to a cylindrical exterior,
      2. each of said tablets being stacked together with one of said planes of one tablet being adjacent to one of said planes of a next of said tablets and forming a stick of desired length, said stick having a longitudinal axis perpendicular to said planes, and
   b. said stick being covered with a sheet of heat shrinkable, liquid impervious synthetic material secured at opposite ends around said cylindrical exterior, leaving the outermost plane of the tablet at each end of said stick uncovered.

2. The package of claim 1 wherein said available chlorine compound is calcium hypochlorite.

3. The package of claim 2 wherein said sheet of heat shrinkable liquid impervious synthetic material is selected from the group consisting of polyethylene, polypropylene, polyvinylchloride, and polyvinylidene chloride.

4. The package of claim 3 wherein the number of tablets in said package is in the range from about 8 to about 60 and the thickness of said tablets is in the range from about 0.25 to about 2.0 inches.

5. The package of claim 4 wherein a portion of said sheet extends past the outermost one of said planes of an exterior tablet in said stick and is sealed to prevent penetration by liquid.

6. The package of claim 4 wherein the number of tablets in said package is in the range from about 40 to about 50 and the thickness of said tablet is in the range of from about 0.25 to about 1.0 inch.

7. The package of claim 6 wherein said sheet of heat shrinkable liquid impervious synthetic material is polyethylene.

8. The package of claims 4, 6, or 7 wherein a portion of said sheet extends past the outermost one of said planes of an exterior tablet and a washer-shaped cap plug is positioned outside of said outermost plane and is held against said outermost plane by shrinking said portion to a diameter smaller than the diameter of said cap plug.

9. A method for preparing a novel package of available chlorine compounds for use in a swimming pool skimming unit for sanitizing water which comprises:
   a. placing a plurality of tablets of said compound in a stack:
      1. each of said tablets having two substantially parallel planes joined to a cylindrical exterior,
      2. each of said tablets being stacked together with one of said planes of one tablet being adjacent to one of said planes of a next of said tablets and forming a stick of desired length, said stick having a longitudinal axis perpendicular to said planes,
   b. placing said stick on a sheet of heat shrinkable, liquid impervious synthetic material:
      1. said sheet having at least one heat shrinkable axis perpendicular to two opposite edges of said sheet,
      2. said longitudinal axis of said stick being positioned perpendicular to said heat shrinkable axis,
   c. heat sealing one of said edges to an opposite of said edges forming a cover for said stick around said cylindrical exterior of each of said tablets, and
   d. heating the resulting covered stick, shrinking said synthetic material around the exterior surface of said tablets and forming a tight, water impervious cover around said stick, whereby said sanitizing occurs when at least a portion of said covered stick is placed into the strainer basket of said swimming pool skimmer, and whereby the available chlorine compound in said covered stick is dissolved at each end of said covered stick by water being circulated through said skimmer.

10. The method of claim 9 wherein said available chlorine compound is calcium hypochlorite.

11. The method of claim 10 wherein said sheet of heat shrinkable liquid impervious synthetic material is selected from the group consisting of polyethylene, polypropylene, polyvinylchloride, and polyvinylidene chloride.

12. The method of claim 11 wherein the number of tablets in said package is in the range from about 8 to about 60 and the thickness of said tablets is in the range from about 0.25 to about 2.0 inches.

13. The method of claim 12 wherein a portion of said sheet extends past the outermost one of said planes of an exterior tablet in said stick and is sealed to prevent penetration by liquid.

14. The method of claim 12 wherein the number of tablets in said package is in the range from about 40 to about 50 and the thickness of said tablet is in the range of from about 0.25 to about 1.0 inch.

15. The method of claim 14 wherein said sheet of liquid impervious synthetic material is polyethylene.

16. The method of claims 12, 14, or 15 wherein a portion of said sheet extends past the outermost one of said planes of an exterior tablet and a washer-shaped cap plug is positioned outside of said outermost plane and is held against said outermost plane by shrinking said portion to a diameter smaller than the diameter of said cap plug.

* * * * *